Patented Nov. 14, 1944

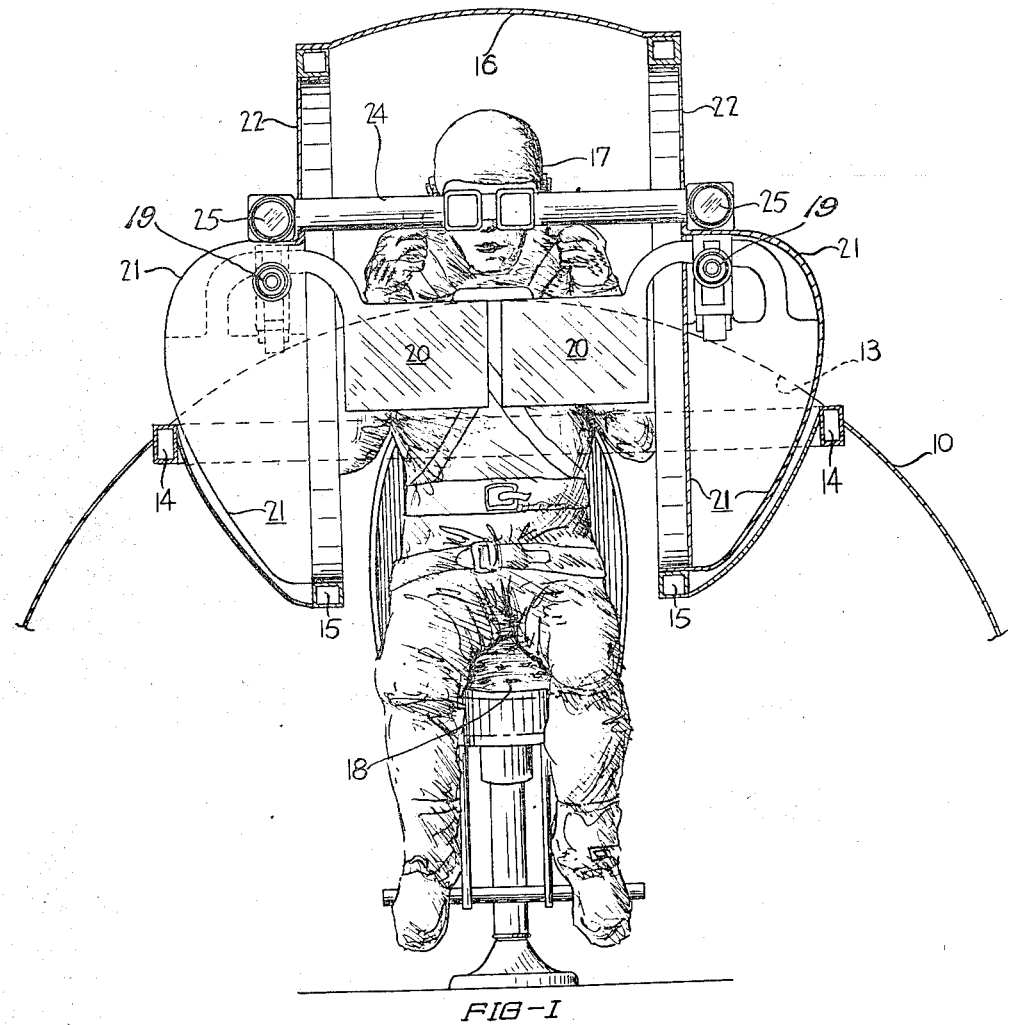
FIG-I
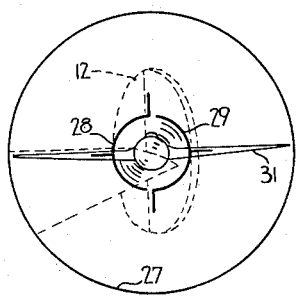
FIG-V

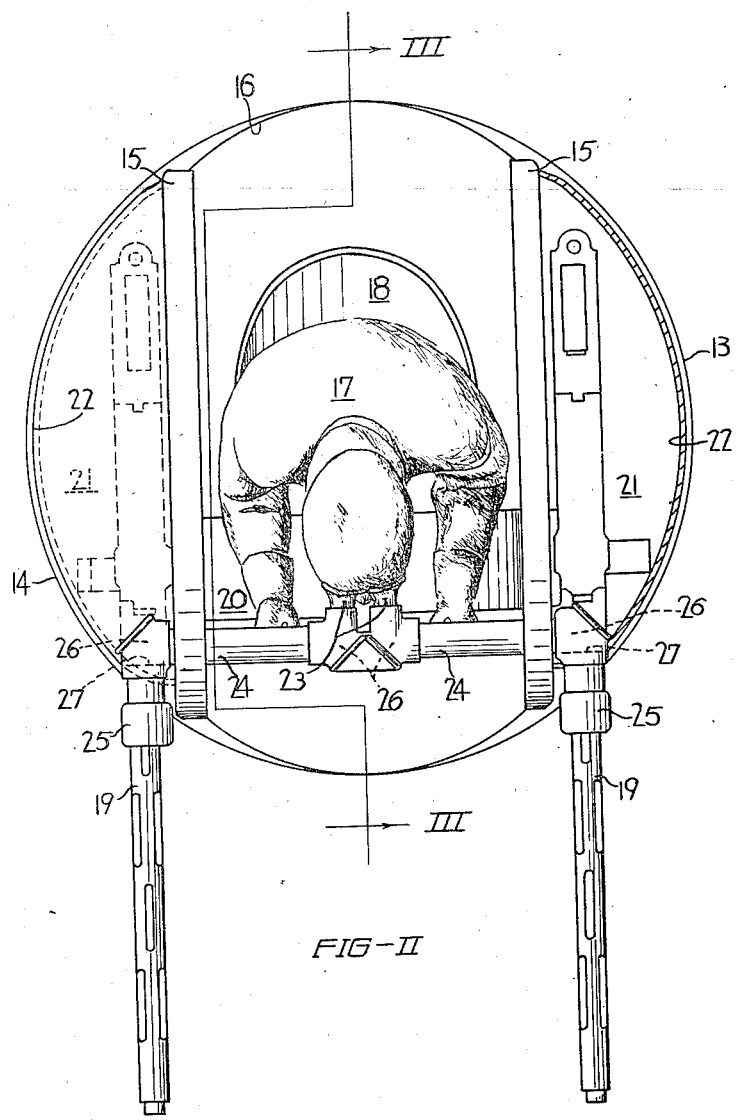

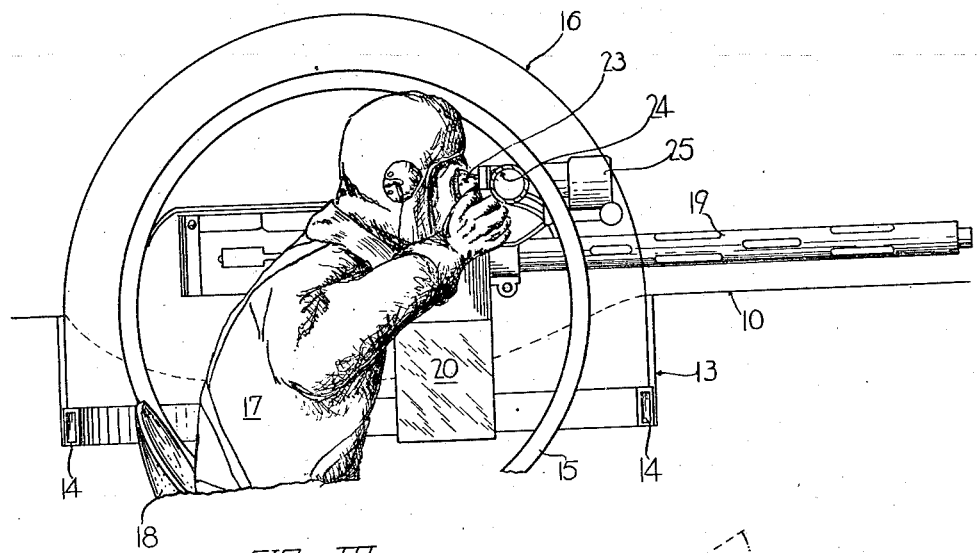
FIG-III
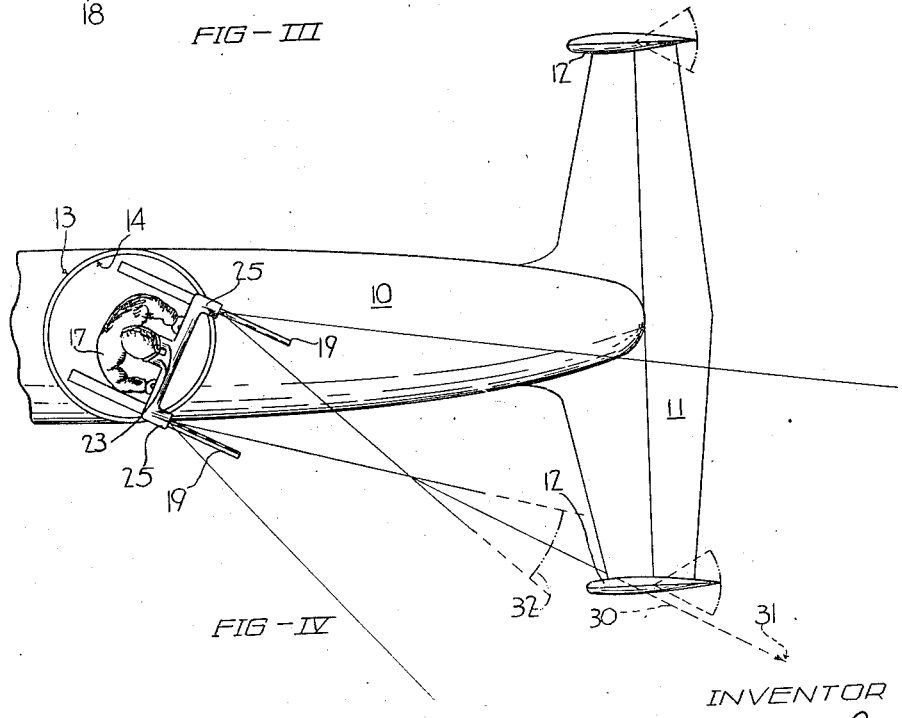
FIG-IV

2,362,887

UNITED STATES PATENT OFFICE 2,362,887

GUN TURRET

Alfred Corte, Glendale, Calif., assignor, by mesne assignments, to Lockheed Aircraft Corporation, a corporation of California Application May 16, 1940, Serial No. 335,482

14 Claims. (Cl. 89—37.5)

This invention relates to an improved gunsight and gun turret for mobile machine guns, cannon, and the like, adapted to provide improved binocular vision past obstructions in the field of view that are relatively close to the gunsight as compared to the target distance.

Optical gunsights heretofore used have generally been of the monocular telescopic type wherein the telescope was mounted on the gun or rifle. The higher the magnification, the more restricted the field of view, both in angle and depth, making it difficult to locate and follow an object in the sight. Any obstacles in the field of view of the sight. Any obstacles in the field of view of such monocular telescopic sights cause a blind spot or hidden area in the field of vision. Such blind spots are very dangerous in connection with fighting equipment, as they allow the unobserved approach of hostile forces and prevent defensive fire thereat. The present invention relates in part to an improved design and arrangement of gunsights which eliminate the above disadvantages. To this end, the gunsight of this invention is constructed as a wide base line prismatic binocular telescope, of very low if any magnification, to increase the angle and depth of field and to eliminate the need of focusing, since the great depth of field thus available can be preselected or adjusted to adequately cover the effective or practical range of guns fired from unstable mobile mounts such as aircraft. For other mounts permitting effective use of the guns at longer ranges, the gunsight of this invention might incorporate one or more of the well known forms of focusing optical systems, eye spacing adjustments, and range finders. The advantage arising from using a low power pre-set fixed focus binocular optical system, in addition to the depth of field of sharp focus, arises from the ability to throw relatively near objects out of sharp focus and to therefore practically eliminate such objects or obstructions from the desired field of view. By utilizing a wide base line binocular optical system, such relatively near objects, if of less width than the optical base line, can be practically eliminated from the field of view and can thus be unconsciously ignored when watching a more distant target, even though it be actually in line with the obstacle and therefore is a blind spot relative to unaided vision.

It is accordingly an object of this invention to provide an improved gunsight of the class described affording improved binocular vision past relatively near obstacles unavoidably associated with the mobile mount carrying a gun or guns aimed by the sight of this invention.

It is another object of this invention to provide an improved gunsight of the class described comprising a binocular telescopic sight mounted on a gun and so aligned and adjusted relative thereto that split pattern reticules associated with the sight objectives define the target area within the effective firing range of the gun.

It is a further object of this invention to provide an improved gunsight of the class described comprising a binocular wide baseline telescopic sight, the objectives of which are each carried by one of a plurality of machine guns so mounted as to be aimed as a unit, for approximately parallel fire.

It is also an object of this invention to provide an improved multiple gun turret and gunsight wherein the gunner sits within a central transparent enclosure mounted for rotation about an approximately vertical axis to provide for traversing the field while the guns are mounted in turret compartments on either side of the gunner for simultaneous elevation and depression about a horizontal axis, the guns each carrying one objective of a binocular telescope, the central eye pieces of which extend to the center of the gunner's compartment, and are so positioned therein that extreme movements of the guns about their horizontal axis require only natural head and shoulder movements to enable the gunner to keep his eyes aligned with the gunsight eye pieces. By so arranging the seat relative to the eye pieces that a head erect position will enable the gunner to see thereover, he will be enabled to watch the entire field while at ease, and approximately align the guns with an approaching target before bending his head slightly to see through the sight eye pieces for the final aiming of the gun.

Other and further important objects of this invention will be apparent from the disclosures in the specification and the accompanying drawings.

This invention is illustrated in the drawings and hereinafter more fully described.

In the drawings:

Figure I is a front or head-on view of a twin gun turret and gunsight embodying a preferred form of this invention, parts having been broken away for clearness.

Figure II is a plan view, with parts broken away, corresponding to the showing of Figure I.

Figure III is a side elevation partly in section as indicated by the line III—III in Figure II.

Figure IV is a schematic plan view to a reduced scale of the turret, guns, and sight of this invention, as mounted in the fuselage of an airplane, with lines added to indicate the field of view.

Figure V is a schematic drawing of the field of view visible to the gunner positioned as in Figure IV.

As shown—

The fuselage of an airplane 10 has been indicated, together with stabilizer and elevator surfaces 11 and twin fins and rudders 12, to assist in explaining the features of this invention. For purposes of illustration, an upper rear gun turret position has been chosen, it being understood that the invention is not limited to such an arrangement but is applicable to other airplane locations, and that the gunsight is adaptable for use in tanks, battleships, and fixed gun mounts.

The gun turret shown in the drawings is mounted in a circular recess 13 in the fuselage 10, a horizontal bearing 14, for pivotal movements about a vertical axis, in turn supporting a pair of spaced vertical bearings 15, the space between which is enclosed by a transparent shell 16, which is fixed to and merely rotates with the horizontal bearing 14.

A gunner 17 is seated beneath the central transparent enclosure, on a seat 18 pivoted coaxial with the horizontal bearing 14. Twin machine guns 19 have suitable mountings on and outboard of the vertical bearings 15 and are vertically elevatable therein as a unit, being fixed relative to each other in any convenient way. It is to be understood that any number of guns may be used without departing from the scope of this invention. As shown, the twin machine guns 19 are arranged to be fed cartridges from magazines 20, and discharge spent shells into the chambers formed by the enclosures 21. Transparent side enclosures 22 are provided for the central enclosure, being carried by the vertical bearings 15 and movable as a unit with the bearings 14 and guns 19. With this arrangement, the gunner and the central part of the turret enclosure are free to rotate in the bearing 14 for traversing the field, while the gunner can at the same time elevate or depress the twin guns 19 and their enclosures 21 as a unit. From an inspection of Figures I and II it will be seen that the turret is divided to have a longitudinal segment forming a central cockpit which is defined at its sides by the enclosures 21 and 22. The gun barrels and forward part of the breeches may project outside the enclosures 21; this arrangement prevents powder gases from entering the central enclosure. The enclosures or elements 21 and 22 may be considered the side members of the central enclosure which is supported for movement about a horizontal axis.

The gunsight of this invention, as disclosed herein, is designed to be mounted on and movable with the twin guns 19. The sight itself is of the binocular type, having adjustably spaced eye pieces 23 mounted near the rotation axis of the guns on a cross-tube 24 connecting objective telescopes 25, with suitable reflecting prisms 26 at the center and ends of the cross tube. The eyepieces 23 are preferably substantially centrally spaced between the two guns 19. The objectives 25 project outside the transparent side enclosures 22 of the turret, and the connecting tube 24 may be sealed therein, since neither the gun breeches nor the objectives need have any movement relative to the side closures, except to mount and dismount the same. The eyepieces 23 are off-set inwardly from the objectives 25, being supported by the connecting tube 24 to be within the central compartment of the turret. The connecting tube 24 is preferably telescopic to provide for pupillary spacing adjustments.

The optical design of the binocular gun sight may be any one of several well known systems. A characterizing feature of the present gun sight resides in the provision of sight patterns formed by reticules 27 located at the focus of the objectives as indicated by the dashed lines 27 in each objective. In the preferred form it is desired to use split field complementary sight patterns 28 and 29 at the objectives 25. The sight patterns are formed so that one-half of the complete design is in each objective. The bifocal vision acts to combine the partial complementary patterns, which can be adjusted to align at the best target distance.

In Figure IV the central sight line 30 from the gun turret to a relatively distance traget 31 passes through the fin and rudder area so that it will be evident that the bifocal field indicated by the arc 32 will extend on both sides of the fin and rudder 12 and the gunner will be able to see the target therepast because of the wide baseline of the objectives 25, although the target would be completely obscured by the fin and rudder as far as direct vision is concerned. Under such circumstances the wide spacing of the twin guns would permit both guns to fire past or bracket the rudder without damage thereto. Since the rudder would be too near to the objectives to be in the field of sharp focus it would appear blurred and hazy and could be subconsciously ignored while observing the more distant target. Figure V illustrates how a relatively distant target 31 would appear to the observer, in spite of the hazy outline of the rudder 12 as indicated by the dotted lines in this view.

It will thus be seen that the present invention provides a gunsight and gun turret having manifold advantages over such devices now available, and having thus described my invention in its present preferred embodiment, I desire to emphasize the fact that many modifications may be resorted to in a manner limited only by a just interpretation of the following claims.

I claim:

1. In combination a gun mount having at least two guns spaced apart and connected to be aimed in unison, an optical sight therefor, comprising a binocular telescope mounted in alignment with said guns to move as a unit therewith, said binocular telescope having its objectives each adjacent to and aligned with one of said guns to provide a wide base line for sighting past relatively near obstacles in the direct field of view and constrained to move with its respective gun during all aiming movements thereof.

2. In combination with a gun mount having at least two guns spaced apart to provide room for a gunner therebetween, said guns being aimed in unison, an optical sight therefore, comprising a binocular telescope mounted in alignment with said guns to move as a unit therewith, said binocular telescope having its objectives each aligned with one of said guns and constrained to move with its respective gun in all movements thereof, and split reticule sight complementary patterns associated with the objectives to indicate the line of fire of the guns in the stereoscopic field of view of the binocular telescopic sight.

3. In combination with a gun mount having at least two guns spaced apart to provide room for a gunner therebetween, said guns being aimed in unison, an optical sight comprising a binocular telescope mounted in alignment with said guns to move as a unit therewith, said binocular telescope having its objectives each associated with one of said guns to remain in alignment therewith during all aiming movements thereof, and reticules associated with the objectives to indicate the line of fire of each of the guns.

4. In combination with a circular gun turret divided into a segment forming a central cockpit and arranged for rotation about a substantially vertical axis and side members arranged for unitary rotation about a horizontal axis supported by said segment, a pair of guns, each gun being mounted on one of said side members for movement therewith, and a binocular telescopic sight including objectives each mounted on one of said guns in alignment therewith, and eyepieces within said segment of the turret.

5. In combination with a circular gun turret divided into a longitudinal segment forming a central cockpit and defined by parallel chords and arranged for rotation about one axis and side members substantially in the planes of said chords and supported on said segment for unitary rotation about an axis at right angles to the axis of rotation of the longitudinal segment, twin guns, each gun being mounted on one of said side members for movement therewith, and a binocular telescopic sight including objectives each mounted on one of said guns in alignment therewith, and eyepieces within the longitudinal segment of the turret.

6. In combination with a circular gun turret divided into a longitudinal segment arranged for rotation about one axis and side members supported on said segment for unitary rotation about an axis at substantially right angles to the axis of rotation of the longitudinal segment, twin guns, each gun being mounted in one of said side members for movement therewith, and a binocular telescopic sight including objectives each mounted on one of said guns in alignment therewith, and eyepieces offset from the objectives to be within the longitudinal segment of the turret.

7. In combination with a gun turret mounting twin guns in substantially parallel spaced relationship to provide room for a gunner therebetween, said guns being elevated and traversed in unison, a binocular telescopic sight having one of its objectives associated with each of said guns in alignment therewith and to be elevated and traversed therewith, said objectives being in substantially the same spaced relationship as the guns, said binocular telescopic sight having its eyepieces in adjacent relationship substantially midway between the twin guns.

8. In combination with a gun turret mounting twin guns in substantially parallel spaced relationship to provide room for a gunner therebetween, said guns being elevated and traversed in unison, a binocular telescopic sight having its eyepieces centrally disposed between the twin guns and its objectives each associated with one of said guns to be elevated and traversed therewith and to be in substantially the same spaced relationship as the guns.

9. In combination with a gun turret mounting twin guns in substantially parallel spaced relationship to provide room for a gunner therebetween, said guns being elevated and traversed in unison, a binocular telescopic sight having its eyepieces centrally disposed between the twin guns and its objectives in substantially the same spaced relationship as and parallel to the lines of fire of the twin guns and mounted to be elevated and traversed in unison with the guns.

10. In combination with a gun turret mounting twin guns in substantially parallel spaced relationship to provide room for a gunner therebetween, said guns being elevated and traversed in unison, a binocular telescopic sight having its eyepieces centrally disposed between the twin guns near the axis of rotation thereof and its objectives associated with said guns to be in substantially the same spaced relationship as the guns.

11. In combination with a gun turret mounting twin guns in substantially parallel spaced relationship to provide room for a gunner therebetween, said guns being elevated and traversed in unison, a binocular telescopic sight having its eyepieces centrally disposed between the twin guns near the axis of rotation thereof and its objectives spaced at opposite sides of the eyepieces to be in adjacent substantially parallel relation to the lines of fire of the twin guns.

12. In combination with a pair of guns having spaced substantially parallel barrels supported for traversing and elevating movements in unison, a binocular gunsight including a pair of objectives, each objective being adjacent to and movable with a gun barrel during traversing and elevating movements of the same and having its optical axis substantially parallel with the line of fire of the barrel, optical tubes extending inwardly toward one another from the objectives, and adjacent eyepieces on the tubes spaced substantially midway between the spaced planes occupied by said barrels.

13. In a turret, a central enclosure, means for supporting the central enclosure for traversing movement, spaced side enclosures, the side enclosures defining the side walls of the turret's interior, means for supporting said side enclosures from said central enclosure for unitary elevating movement relative thereto, and a binocular optical sighting system including objectives positioned at the exteriors of said side enclosures and movable with said side enclosures during elevating movement thereof, and eyepieces offset inwardly from the side enclosures to be within the turret interior.

14. In a turret, a central enclosure, means for supporting the central enclosure for traversing movement, spaced side enclosures, the side enclosures defining the side walls of the turret's interior, means for supporting said side enclosures from said central enclosure for unitary elevating movement relative thereto, and a binocular optical sighting system including an objective on the exterior of each side enclosure, the objectives being movable with the side enclosures during elevating movement thereof, and eyepieces substantially centrally located between the side enclosures within the interior of the turret.

ALFRED CORTE.